(12) United States Patent
Michioka et al.

(10) Patent No.: US 6,401,867 B1
(45) Date of Patent: Jun. 11, 2002

(54) LUBRICANT SUPPLY SYSTEM

(75) Inventors: Hidekazu Michioka, Tokyo; Mitsuaki Honma, Yamanashi-ken, both of (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/288,619

(22) Filed: Apr. 9, 1999

(30) Foreign Application Priority Data

Apr. 16, 1998 (JP) ............................................ 10-106104
Sep. 22, 1998 (JP) ............................................ 10-268218

(51) Int. Cl.[7] ............................................. F16C 17/00
(52) U.S. Cl. ............................. 184/5; 384/13; 184/100
(58) Field of Search ........................... 184/3.1, 5, 15.1, 184/21, 22

(56) References Cited

U.S. PATENT DOCUMENTS

| | | | | |
|---|---|---|---|---|
| 860,375 A | * | 7/1907 | Hartley et al. | 184/22 |
| 1,017,331 A | * | 2/1912 | Snyder | 184/22 |
| 1,045,977 A | * | 12/1912 | Hirz | 184/22 |
| 1,109,125 A | * | 9/1914 | Heisler et al. | 184/22 |
| 1,216,607 A | * | 2/1917 | Primm | 184/22 |
| 1,274,942 A | * | 8/1918 | Schenck | 184/22 |
| 1,290,618 A | * | 1/1919 | MacIndoe | 184/22 |
| 1,294,733 A | * | 2/1919 | Weigele | 184/22 |
| 2,980,942 A | * | 4/1961 | Dabney, Jr. | 184/22 |
| 3,583,774 A | * | 6/1971 | Nijmegen | 184/5 |
| 5,399,023 A | | 3/1995 | Winkelmann et al. | 384/13 |
| 5,547,285 A | | 8/1996 | Hutzel et al. | 384/15 |
| 6,155,717 A | | 12/2000 | Michioka et al. | 384/15 |

FOREIGN PATENT DOCUMENTS

| | | |
|---|---|---|
| EP | 0905395 A1 | 3/1999 |
| JP | 06307442 | 1/1994 |
| JP | 6-307442 | 11/1994 |

* cited by examiner

Primary Examiner—David A. Bucci
Assistant Examiner—Chong H. Kim
(74) Attorney, Agent, or Firm—Arent Fox Kintner Plotkin & Kahn, PLLC

(57) ABSTRACT

A lubricant supplying unit preferable for a linear motion apparatus such as a linear guide unit and a ball screw unit, always capable of coating all rolling body rolling grooves formed on a track shaft with an equal amount of lubricant regardless of a difference in the mounting posture of the track shaft with respect to a fixing unit, is provided. A lubricant supplying system for achieving such an object comprises a casing fixed to the slide member, a plurality of coating pieces which are protruded from plural positions of the casing so that they are in contact with the track shaft for coating the track shaft with lubricant and a lubricant accommodating chamber provided in the casing for supplying lubricant to the coating piece, wherein the plurality of the coating pieces are divided to groups consisting of one or two or more adjacent coating pieces and the lubricant accommodating chambers is formed for each of the groups.

3 Claims, 18 Drawing Sheets

LUBRICANT SUPPLY SYSTEM

BACKGROUND OF THE INVENTION

1. Field of the Invention

This invention relates to a lubricant supplying unit for coating the surface of the track shaft with lubricant in a linear motion apparatus, for example, a linear guide unit and ball screw, in which a track shaft engages a slide member such that they are movable relative to each other through rolling bodies such as balls and rollers, and more specifically, to a linear motion apparatus using the same.

2. Description of the Related Art

Conventionally, this kind of the linear motion apparatus has been used in a linear guide section of a machine tool, transfer unit and the like, and includes a linear guide unit which is mounted on a fixing unit such as a bed and a saddle for guiding a movable unit such as a table and a ball screw which is used together with this linear motion unit for providing the above mentioned movable unit with the linear motion stroke depending on a rotation speed of a motor.

The former linear guide unit comprises a track rail (track shaft) which is disposed on the aforementioned fixing unit and in which rolling grooves for balls are formed in the length direction thereof, and a sliding base (sliding member) which has a load rolling groove opposing the rolling groove in the track rail through a plurality of balls and in which an infinite circulation path for the balls rolling in the load rolling groove is formed. This linear guide unit is so constructed that the sliding base supporting the aforementioned movable body carries out linear motion continuously along the track rail with an infinite circulation of the balls. On the contrary, in some cases, the track rail is so constructed to move relative to the fixed sliding base.

On the other hand, the latter ball screw comprises a screw shaft (track shaft) in which a spiral ball rolling groove is formed at a predetermined lead and a nut member (slide member) which has a load rolling groove opposing the ball rolling groove through a plurality of balls and in which an infinite circulation path for the balls rolling in this load rolling groove is formed. This ball screw is so constructed that the balls circulate in the aforementioned infinite circulation path with a relative rotation between the screw shaft and nut member and the nut member and screw shaft move relative to each other in the axial direction.

Upon use of these linear motion apparatuses, the balls, rolling grooves and the like need to be appropriately lubricated depending on a use condition in order to suppress wear of the balls themselves, rolling grooves of a track rail or screw shaft in which the balls roll and load rolling groove of a sliding base or nut member, and further maintain a high precision motion of the slide member for a long time.

Unexamined Published Japanese Patent Application No. 307442/1994 has disclosed a lubricant supplying system for supplying lubricant to balls, rolling grooves and the like. As shown in FIG. 22, in this lubricant supplying system, a pad 127 soaked in lubricant is accommodated within a cover frame 128 and the cover frame 128 is engaged with a track rail 129 so that the pad 127 inside comes into contact with the track rail 129. The cover frame 128 is mounted backward and forward with respect to the traveling direction of the cover frame 128 such that as the sliding base 130 moves, the aforementioned pad 127 comes into contact with the track rail 129. Therefore, if the sliding base 130 moves back and forth along the track rail 129, lubricant leaking from the aforementioned pad 127 is coated on the surface of the track rail 129 so that lubricant is supplied to the rolling grooves and balls.

However, because in the conventional lubricant supplying system, lubricant is applied to all the rolling grooves for balls provided in the track rail with a substantially single pad, there is a problem that lubricant cannot be applied equally to all the rolling grooves depending on a mounting posture of the track rail relative to the fixing unit such as a bed.

That is, lubricant is likely to flow vertically downward within the pad by its own gravity, for example, as shown in FIG. 23, if the track rail is mounted on the fixing portion 130 in a laterally fallen condition more lubricant is contained in the lower half portion of the pad. Therefore, although a sufficient amount of lubricant can be applied to the side face of the track rail positioned down, the sufficient amount of lubricant cannot be applied to the side face of the track rail positioned up, so that lubricant cannot be applied equally to all the rolling grooves.

OBJECT AND SUMMARY OF THE INVENTION

Accordingly, the present invention has been made in viewpoints of these problems, and it is an object of the invention to provide a lubricant supplying unit preferable for a linear motion apparatus such as a linear guide unit, a ball screw unit and the like, always capable of coating all rolling body rolling grooves formed on a track shaft with an equal amount of lubricant regardless of a difference in the mounting posture of the track shaft with respect to a fixing unit, and more to provide a linear motion apparatus using the same.

That is, to achieve the above object, the present invention provides a lubricant supplying system mounted on a slide member engaging a track shaft through rolling bodies for applying lubricant to the track shaft with a relative motion between the slide member and track shaft, the lubricant supplying system comprising: a casing fixed to the slide member; a plurality of coating pieces which are protruded from plural positions of the casing so that they are in contact with the track shaft for coating the track shaft with lubricant; and lubricant accommodating chambers provided in the casing for supplying lubricant to the coating piece, wherein the plurality of the coating pieces are divided into groups comprising one or two or more adjacent coating pieces, and each group has a lubricant accommodating chambers.

The linear motion apparatus of the present invention comprises a track shaft in which rolling faces for rolling bodies are formed, a sliding member which engages the track shaft through the rolling bodies and slides relative to said track shaft, and a lubricant supplying member which is mounted on the sliding member for coating the surface of the track shaft with lubricant with such a relative motion, wherein the lubricant supplying member comprising a casing fixed to the sliding member, coating pieces which are protruded from plural positions of this casing such that they are in contact with the track shaft for coating the track shaft with lubricant, and lubricant accommodating chambers provided in the casing for supplying lubricant to the coating pieces, the plurality of the coating pieces being divided to groups consisting of one or two or more adjacent coating pieces while lubricant accommodating chamber formed dividedly for each group.

According to such a technological method, the plurality of the coating pieces for coating the track shaft with lubricant are protruded from the plural positions of the casing such that they are in contact with the track shaft and lubricant is supplied from the lubricant accommodating chamber in the casing to the coating pieces. As a result, if the sliding member moves relative to the track shaft, lubricant is coated to the surface of the track shaft by each coating piece.

According to the present invention, as the plurality of the coating pieces are divided to groups consisting of one or two or more adjacent coating pieces and the lubricant accommodating chamber is formed dividedly for each group, lubricant is only allowed to flow in the lubricant accommodating chamber of each group, thus it will not be concentrated on a particular position in the casing.

Thus, the amount of lubricant to be supplied to each coating piece can be substantially equalized, so that it is possible to coat the track shaft with constantly equal amount of lubricant unconcentratedly from these coating pieces.

Further, because in such linear motion apparatus using the lubricant supplying unit of the present invention, a substantially equal amount of lubricant is always coated to the track shaft from the plurality of the coating pieces regardless of the mounting posture of the track shaft, all the rolling bodies rolling on the rolling faces formed in the track shaft can be lubricated excellently, so that the motion accuracy of the sliding member relative to the track shaft can be maintained in an excellent condition for a long time.

From a viewpoint of equalizing the amount of lubricant to be supplied to each coating piece with such a technological means, it is preferable to divide the lubricant accommodating chamber corresponding to each coating piece.

Upon storing lubricant in the lubricant accommodating chamber, lubricant may be stored as it is. However, if considering ease of assembly of the unit, prevention of leak of lubricant and the like, it is preferable to place an absorbing body for absorbing and holding lubricant in the lubricant accommodating chamber.

Further, if lubricant held in the lubricant accommodating chamber is absorbed directly by the absorbing pieces, in case where the amount of lubricant in the lubricant accommodating chamber is still large, a large amount of lubricant is coated to the track shaft, while if the amount of lubricant in the lubricant accommodating chamber decreases, only a slight amount of lubricant is coated to the track shaft. Thus, it is difficult to coat the track shaft always with a constant amount of lubricant. Therefore, in such a viewpoint, it is preferable to provide with some oil amount control means for controlling an amount of lubricant to be supplied to the coating piece from the absorbing body.

Still further, in case where the lubricant supplying unit of the present invention mounted on a sliding base of a linear motion apparatus or a ball nut of a ball screw unit is damaged unexpectedly, it is important that the replacement of the damaged unit can be carried out easily. Therefore, from such a viewpoint, it is preferable to construct the casing with a pair of casing half bodies, provide each casing half body with a lubricant accommodating chamber and connect the respective casing half bodies with each other by a joint portion so that the casing can be attached or detached to/from the track shaft by opening the casing half bodies.

With such a structure, if the casing is mounted on the sliding member in such a condition that the track shaft is sandwiched by the pair of the casing half bodies, the coating pieces can be brought into contact with the track shaft, while upon replacing the lubricant supplying unit, the coating pieces can be detached from the track shaft by opening the casing half bodies, thus the lubricant supplying unit can be attached or detached to/from the sliding member not through an end of the track shaft. Consequently, if the replacement of the lubricant supplying unit is necessary because of an unexpected damage or the like, the lubricant supplying unit can be replaced without dismounting the sliding base from the track rail, thereby making it possible to carry out such a replacement work easily and at a low cost.

DESCRIPTION OF THE PREFERRED EMBODIMENTS

Hereinafter, a lubricant supply system of the present invention and a linear motion apparatus using the same will be described in detail with reference to the accompanying drawings.

Figure 1:
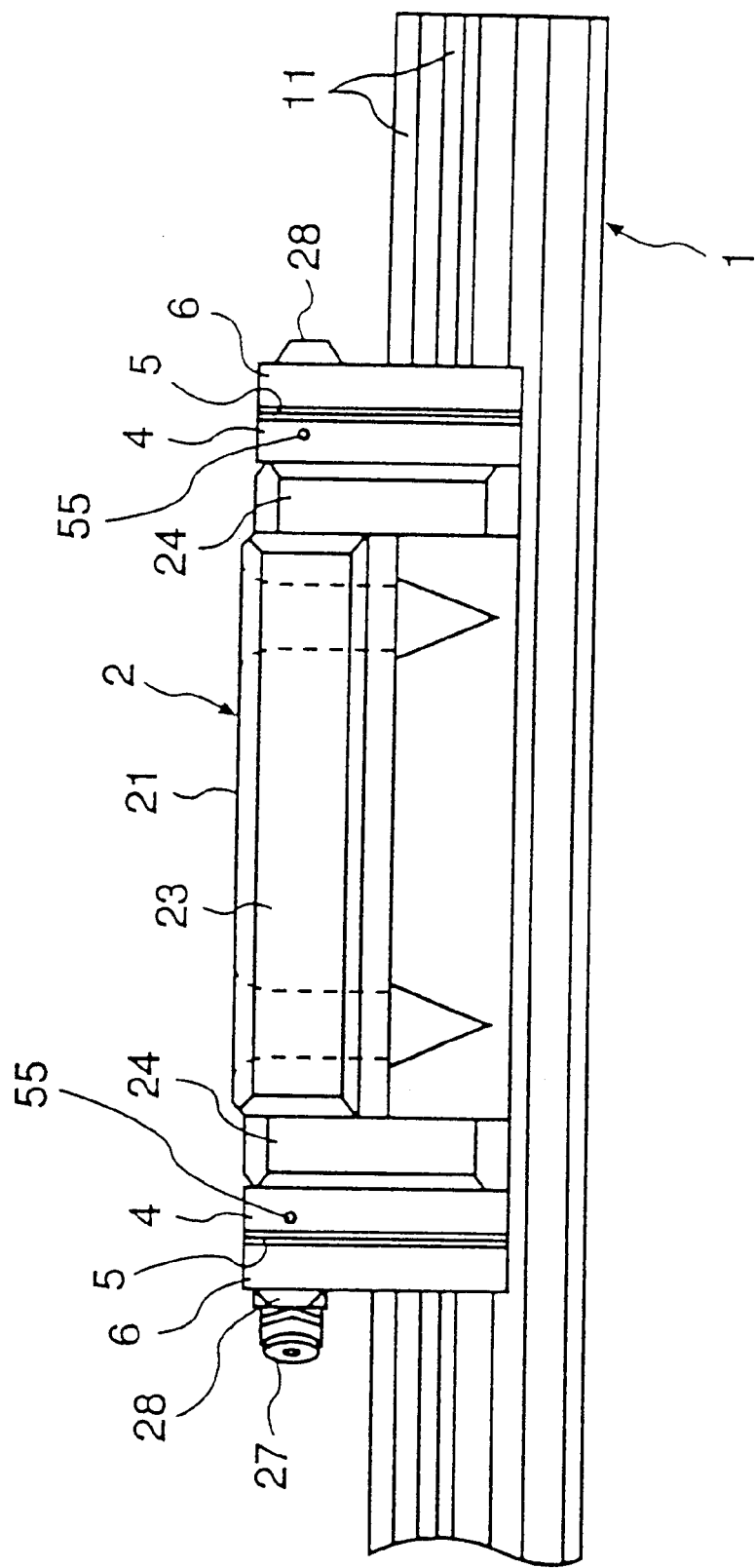
FIG. 1 is a side view showing an embodiment in which the present invention is applied to a linear guide unit.
Figure 2:
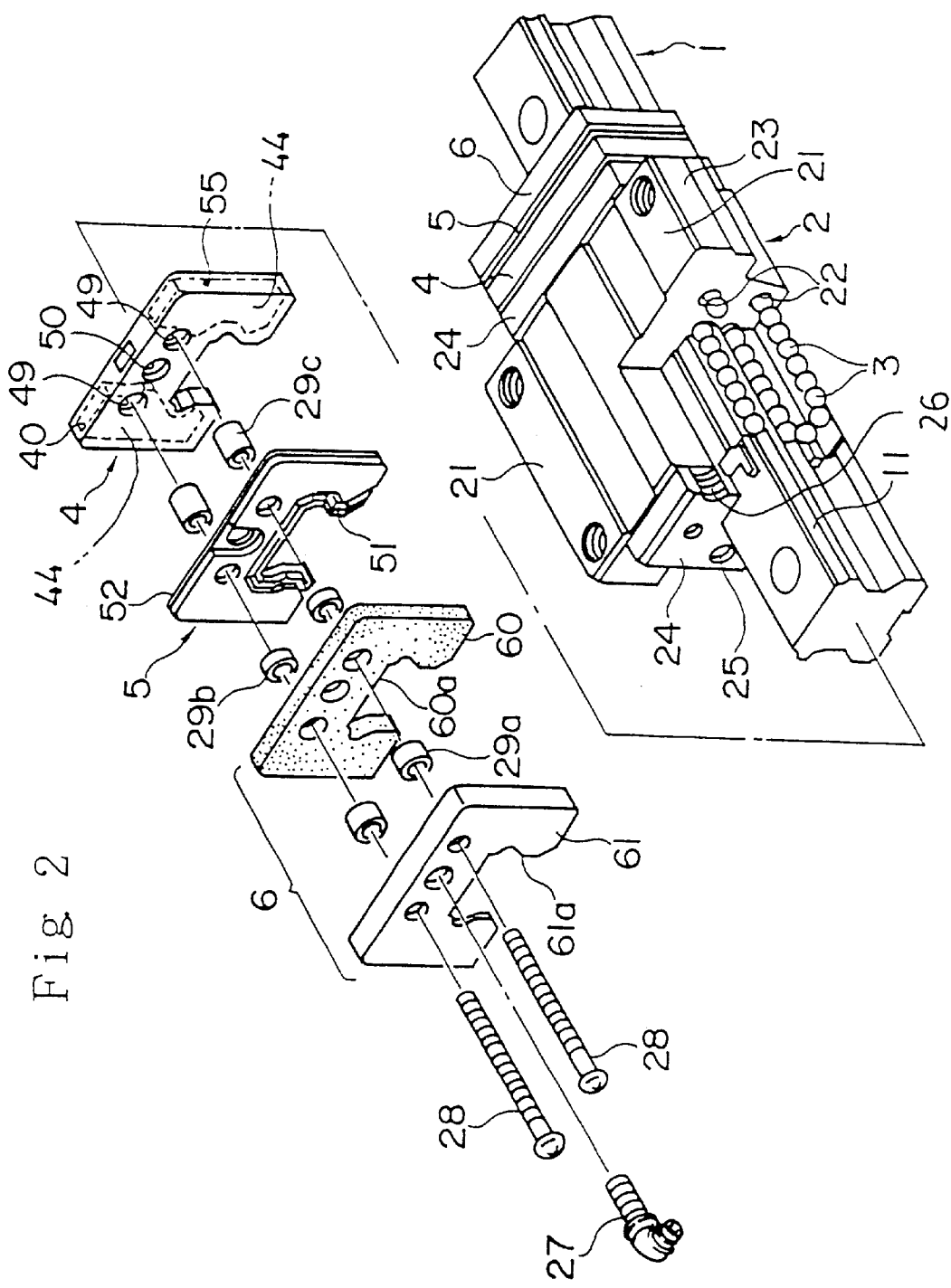
FIG. 2 is a disassembly perspective view of a linear guide unit according to the embodiment and an apparatus attached thereto.
Figure 3:
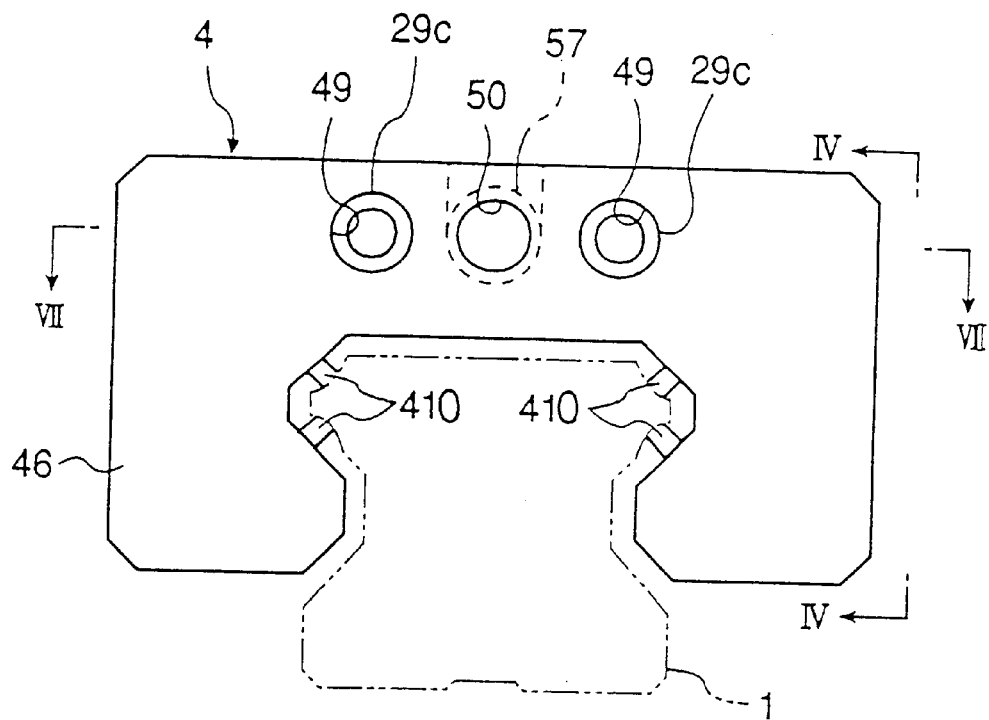
FIG. 3 is a front view showing a lubricant supplying member to be mounted to a sliding base of this embodiment.

FIGS. 1 and 2 are a side view showing an example in which a lubricant supply system is mounted on a linear guide unit, as an example of the linear motion apparatus of the present invention and a disassembly perspective view thereof. This linear guide unit comprises a track rail (track shaft) 1 in which a ball rolling surface 11 is formed in the length direction thereof, a sliding base (sliding member) 2 which engages the track rail 1 through a plurality of balls 3 as a rolling body and contains an infinite circulation path for the balls internally, a pair of lubricant supplying members 4, 4 which are mounted on both front and rear ends in the traveling direction of this sliding base 2 and apply lubricant to the surface of the track rail 1 with a motion of the sliding base 2, end seals 5 as a sealing member which is provided with a seal lip portion 51 in a firm contact with the track rail 1 and disposed outside the aforementioned lubricant supplying member 4, and protective scrapers 6 which are mounted on the sliding base 2 outside the end seal 5 and in a firm contact with the track rail 1 whereby the sliding base 2 is reciprocally moved as the balls 3 are circulated. Referring to FIG. 2, in the aforementioned end seal 5, rubber layer is vulcanized and bonded to a thin plate core metal 52 so as to form the aforementioned seal lip 51.

The sliding base 2 has a mounting surface 21 for such a machine as a table, and comprises a substantially saddle shaped block body 23 having a ball return hole 22 for circulating the balls 3 and a pair of end plates 24, 24 fixed to both end faces of the block body 23. In the end plate 24, a direction changing path (not shown) in which the ball 3 is scooped up from the ball rolling face 11 of the track rail 1, fed to the ball return hole 22 of the block body 23 and then fed from the ball return hole 22 to the ball rolling face 11 is formed. By fixing this end plate 24 to the block body 23 by means of the fixing bolts 25, the infinite circulation path for the ball 3 is formed in the sliding base 2.

Further, an oil port 26 is provided on the end plate 24 for supplying lubricant to the infinite circulation path. A supply nipple 27 is mounted in the oil port 26 through the protective scraper 6, end seal 5 and lubricant supplying member 4.

Further, the protective scraper 6, end seal 5 and lubricant supplying member 4 are mounted on the sliding base 2 through each end plate 24 by means of the fixing bolts 28. To protect the protective scraper 6 and the like from being damaged when the fixing bolts 28 are tightened firmly, bosses 29a, 29b, 29c corresponding to the thickness of each member 4, 5, 6 are fit therein and the aforementioned fixing bolts 28 pass through these bosses so that they are screwed into the sliding base 2.

FIGS. 3–7 show the aforementioned lubricant supplying member 4.

As shown in the Figures, the lubricant supplying member 4 comprises a casing (see FIG. 2) which is to be mounted on the end plate 24 of the sliding base 2, an application body 41 which is accommodated in this casing 40 and kept into contact with the track rail 1 for applying lubricant to the track rail 1 (see FIGS. 5–7), an absorbing body 42 (see FIGS. 5–7) which is accommodated in the casing 40 together with this application body 41 and absorbs and maintains lubricant while supplying lubricant to the application body 41, and an oil amount adjusting plate (oil amount control means) 43 (see FIGS. 5–7) for separating the application body 41 from the absorbing body 42.

The casing 40 comprises a casing main body 45 containing a lubricant accommodating chamber 44 which serves as an accommodating space for the absorbing body 42 and application body 41 and a lid substrate 46 for sealing the lubricant accommodating chamber 44 of this casing main body 45. This casing 40 is mounted such that the lid substrate 46 is in contact with the end plate 24.

The casing main body 45 is constructed by erecting a side wall 48 made of rubber, synthetic resin or the like along a contour of a substrate 47 made of, for example, steel plate. A concave portion surrounded by the substrate 47 and side wall 48 serves as the lubricant accommodating chamber 44 for accommodating the application body 41 and absorbing body 42. The lubricant accommodating chamber 44 is formed so as to avoid the through holes 49, 50 for the fixing bolts 28 and supply nipple 27 and the lubricant accommodating chambers 44, 44 corresponding to the right and left side faces of the track rail 1 are provided independently, so that the application body 41 and absorbing body 42 for lubricating the left side of the track rail 1 and those for lubricating the right side of the track rail 1 are accommodated independently.

The application body 41 is desired to be made of material facilitating a movement of lubricant because of capillary phenomenon, for example, fiber entangling body such as felt having a low percentage of void so as to be capable of coating the track rail 1 with lubricant soaked in the application body 41. In this embodiment, wool felt in which the percentage of void is 54% is used. In order to absorb and deep a large amount of the lubricant, the absorbing body 42 is desired to be made of fiber entangling body such as felt having a high percentage of void. In this embodiment, rayon mixed wool felt in which the percentage of void is 81% is employed.

On the other hand, a concave groove 480 is formed at a position opposing the ball rolling face 11 of the track rail 1 on the side wall 48 of the casing main body 45 and coating pieces 410 which are part of the application body 41 accommodated in the lubricant accommodating chamber 44 are protruded from the concave groove 480 so that they come into contact with the ball rolling face 11. That is, lubricant supplied from the absorbing body 42 to the application body 41 is applied to the ball rolling face 11 of the track rail 1 through the coating pieces 410. As described above, the lubricant accommodating chambers 44 are provided so that the one corresponding to the left side and the other corresponding to the right side are disposed independently. In this embodiment, two ball rolling faces 11, 11 are formed on each of the right and left side faces of the track rail 1. The two coating pieces 410, 410 adjacent to each other located on the left side of the track rail 1 and the two coating pieces 410, 410 adjacent to each other located on the right side thereof are supplied with lubricant from the separate lubricant accommodating chambers 44, 44.

A step portion 54 is formed along an inner edge of the lubricant accommodating chamber 44 of the side wall 48 and the oil amount adjusting plate 43 is fit to this step portion 54 so as to separate the application body 41 from the absorbing body 42. The oil amount adjusting plate 43 is formed of, for example, stainless thin plate (0.1–0.2 mm thick in this embodiment). For example, a single supply hole 56 for supplying lubricant soaked in the absorbing body 42 is made therein. A supply amount of lubricant to be supplied from the absorbing body 42 to the application body 41 is controlled depending on a diameter and number of the supply holes 56 and opening area. Although the shape of the supply hole is circular in this embodiment, it is permissible to apply other shape. The supply hole 56 is desired to be made at a position indicated by broken lines of FIG. 6. This is a position which is located at a substantially same distance from the two ball rolling faces 11, 11 to which lubricant is to be supplied from each application body 41.

Figure 4:
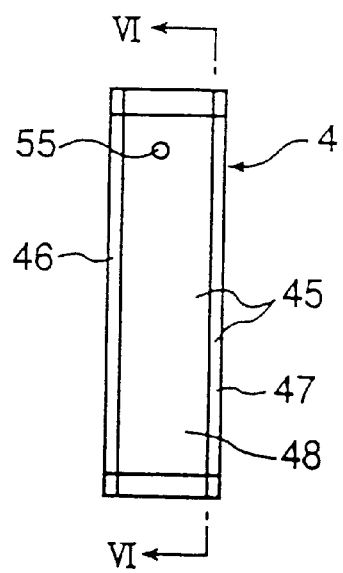
FIG. 4 is a sectional view taken along the line IV—IV of FIG. 3.
Figure 5:
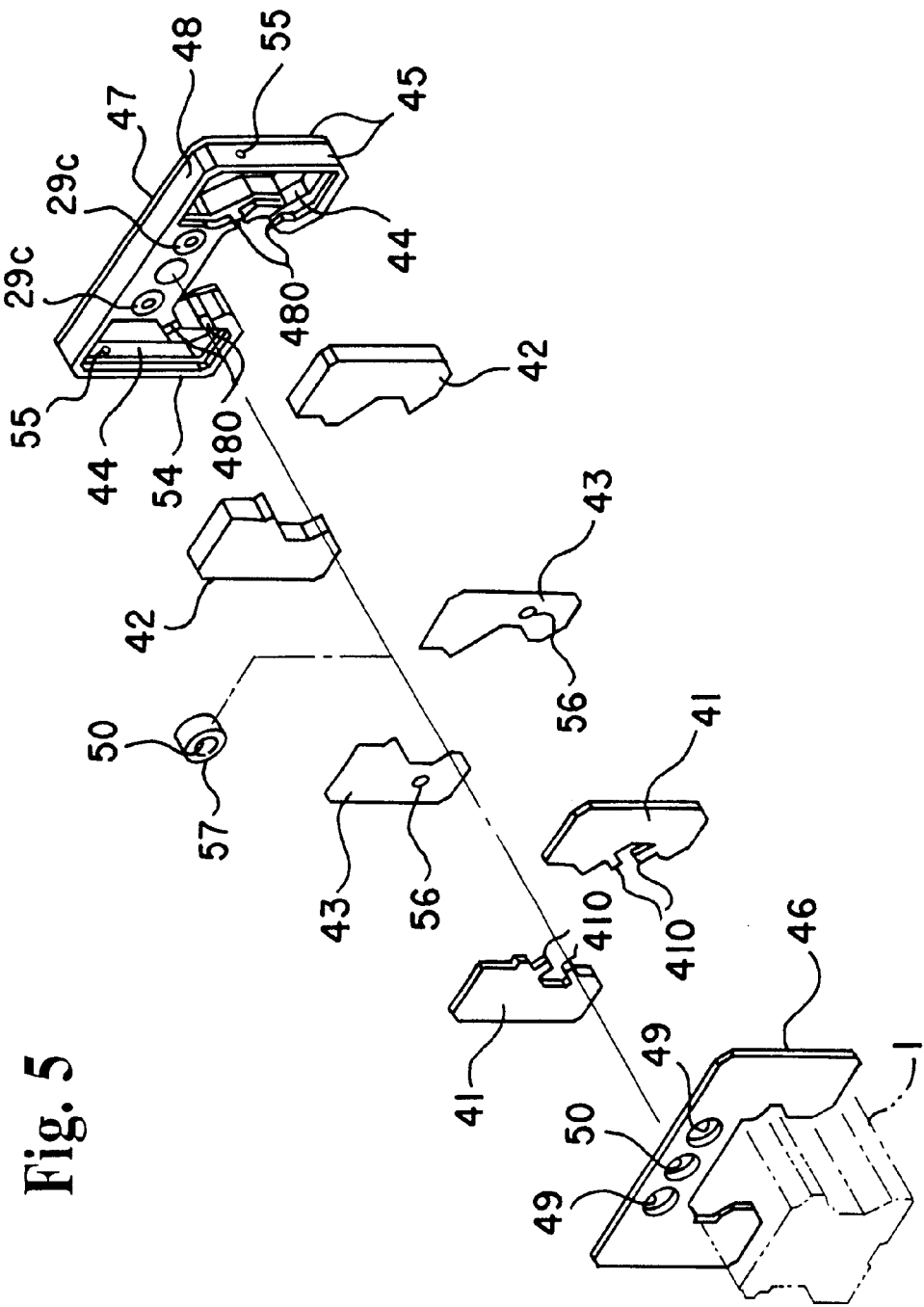
FIG. 5 is a disassembly perspective view of the lubricant supplying member according to the embodiment.
Figure 6:
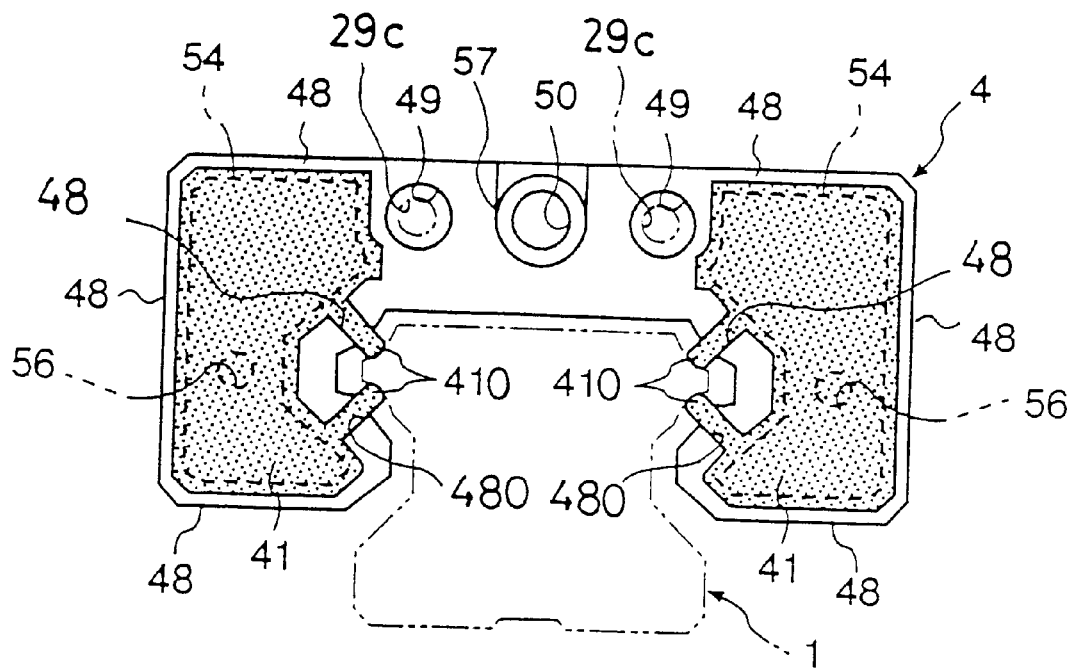
FIG. 6 is a sectional view taken along the line VI—VI of FIG. 4.
Figure 7:
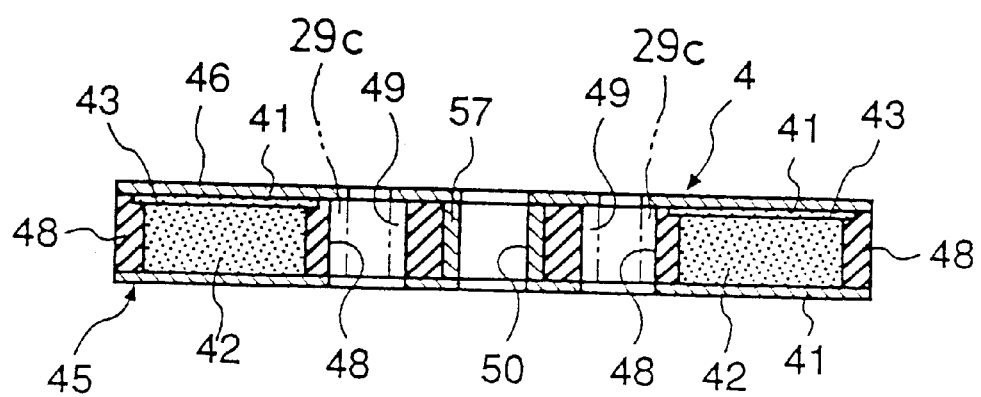
FIG. 7 is a sectional view taken along the line VII—VII of FIG. 3.

To supply lubricant smoothly from the absorbing body 43 to the application body 42, as shown in FIG. 4, an air hole 55 is made in the side wall 48 of the casing 45 so as to always keep a pressure in the casing 40 at the atmospheric pressure. Therefore, movement of lubricant from the absorbing body 42 to the application body 41 depends on mainly capillary phenomenon of lubricant inside the fiber entangling body. Of lubricant soaked in the absorbing body 42, lubricant positioned upward of the supply hole 56 of the oil amount adjusting plate 43 is moved to the application body 41 by gravity.

For the lubricant supplying member 4 having such a structure, first of all, the side wall 48 is vulcanized and bonded to the substrate 47 so as to produce the casing main body 45. The absorbing body 42 soaked with lubricant is put into the lubricant accommodating chamber 44 of the casing main body 45 and after that, the oil amount adjusting plate 43 is fit to the step portion 54 of the side wall 48 so as to cover the absorbing body 42. Then, the application body 41 is placed on the oil amount adjusting plate 43 and finally, the lid substrate 46 is joined to the side wall 48 of the casing main body 45 by vulcanized bonding. As a result, the lubricant supplying member 4 incorporating the application body 41 and absorbing body 42 is completed. Reference numeral 57 of FIG. 5 designates a ring member which forms the through hole 50 for the supply nipple 27 and prevents a direct contact between the side wall 48 and supply nipple 27.

On the other hand, the protective scraper 6 comprises an elastic member 60 soaked in lubricant and a reinforcement plate 61 for fixing this elastic member 60 in a condition that it is sandwiched between the reinforcement plate 61 and the sliding base 2. The elastic member 60 is in firm contact with the surface of the track rail 1 and scrapes off dust and foreign matter attached to the track rail 1 with a movement of the sliding base 2. Additionally, the elastic member 60 applies lubricant little by little to the surface of the track rail 1.

The elastic member 60 has a concave portion 60a which is fit to a upper half portion of the track rail 1 so that it is formed so as to have a substantially saddle shaped cross section. In this embodiment, foam urethane having a minute cell structure is utilized as the material. The air bubbles of this foam urethane are formed to be continuous to contain lubricant. Specifically, foam urethane having a tensile strength of 43 kg/cm$^3$, elongation rate of 360%, density of 0.5g/cm$^3$ and impact resilience of 53% is used.

Figure 8:
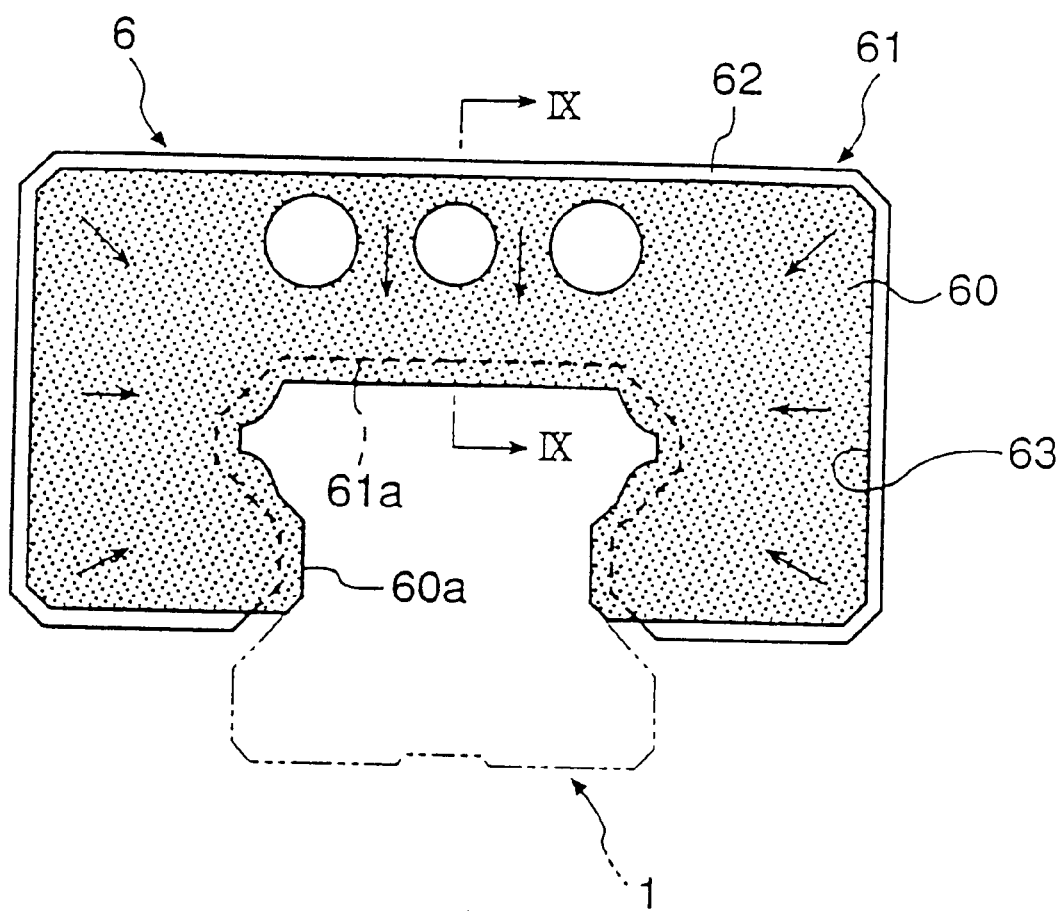
FIG. 8 is a rear view of a protective scraper according to the embodiment.
Figure 9:
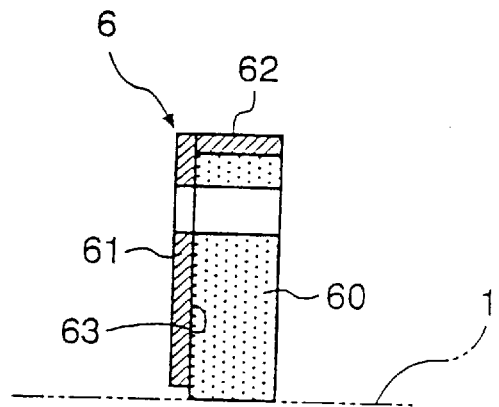
FIG. 9 is a sectional view taken along the line IX—IX of FIG. 8.

The reinforcement plate 61 is formed in a substantially same shape as the elastic member and as shown in FIGS. 8 and 9, the side wall 62 is erected along the peripheral portion thereof so that a concave section 63 for accommodating the elastic member 60 exists. The elastic member 60 is formed to be slightly larger than the size of the concave section 63 and when pressed into the concave section 63, the elastic member 60 is compressed by the side wall 62 from the periphery, so that it is elastically deformed toward the track rail 1 as indicated by arrow lines of FIG. 8. Therefore, if the elastic member 60 is accommodated in the concave section 63 of the reinforcement plate 61, the elastic member 60 is expanded out slightly to the concave portion 60a, so that the degree of fitting to the track rail 1 is increased, thereby intensifying the removal capacity for dust and the like of the protective scraper 6.

The concave section 61a formed in the reinforcement plate 61 opposes the surface of the track rail 1 through a slight gap (0.05 mm) and the reinforcement plate 61 scrapes off spatter adhering to the track rail 1. As a result, a foreign matter firmly adhering to the track rail 1 or a large foreign matter never goes into the gap between the elastic member 60 and the track rail 11, whereby the elastic member 60 is prevented from being damaged.

In the linear guide unit of this embodiment having the above described structure, when the sliding base 2 is moved on the track rail 1, the ball rolling face 11 of the track rail 1 is coated with lubricant by the lubricant supplying member 4, then the balls 3 rolling on the ball rolling face 11 are lubricated. Further, because the end seal 5 which comes in firm contact with the surface of the track rail 1 is mounted outside the lubricant supplying member 4, lubricant applied to the track rail 1 from the lubricant supplying member 4 never leaks out of the end seal 5, so that the balls 3 can be lubricated securely with only a slight amount of lubricant applied to the ball rolling face 11 of the track rail 1 from the lubricant supplying member 4.

Further, because the protective scraper 6 is mounted outside the end seal 5 in this embodiment, when the sliding base 2 is moved on the track rail 1, the reinforcement plate 61 of the protective scraper 6 removes a large foreign matter or a foreign matter firmly adhering to the track rail 1 and further, the elastic member 60 in firm contact with the track rail 1 removes fine particles on the track rail 1. As a result, there never occurs a case in which these foreign matters damage the end seal 5 or scratches the balls 3 and the ball rolling face 11 of the track rail 1, so that the motion accuracy of the sliding base 2 can be maintained for a long term.

Further, because the elastic member 60 of the protective scraper 6 applies lubricant to the track rail 1 although the application amount is slight, frictional resistance between the track rail 1 and end seal 5 is softened by such lubricant thereby making it possible to secure a smooth motion of the sliding base 2.

Figure 10:
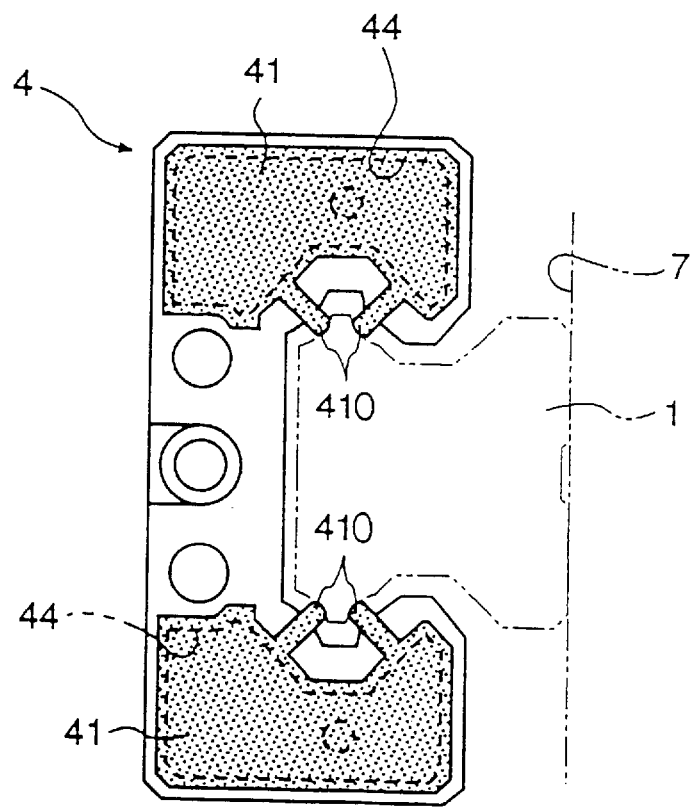
FIG. 10 is a sectional view showing an inside condition of a lubricant supplying member in case where a track rail is mounted on a vertical fixing unit.

According to the lubricant supplying member 4 of this embodiment, a plurality of the coating pieces 410, 410 in contact with the left side face of the track rail 1 and a plurality of the coating pieces 410, 410 in contact with the right side face serve for each group and each lubricant accommodating chamber 44 is formed for each group. As a result, even in a case where the track rail 1 of the linear motion system is fixed in a laterally fallen condition relative to a vertical fixing portion 7 as shown in FIG. 10, lubricant soaked in the absorbing body 42 is never stored locally at a particular position in the casing 40 so that lubricant can be supplied substantially equally to each coating piece 410 from the absorbing body 42.

That is, because the plurality of the coating pieces adjacent to each other serve as each group and the lubricant accommodating chamber 44 is formed separately for each group, there is no big difference in position energy possessed by lubricant in the lubricant accommodating chamber 44 relative to each coating piece 410. Therefore, the movement of lubricant inside the application body 41 mainly depends on the capillary phenomenon described previously, so that the amount of lubricant to be applied to the track rail 1 from each coating piece 410 can be equalized regardless of the fitting state of the track rail 1.

Figure 11:
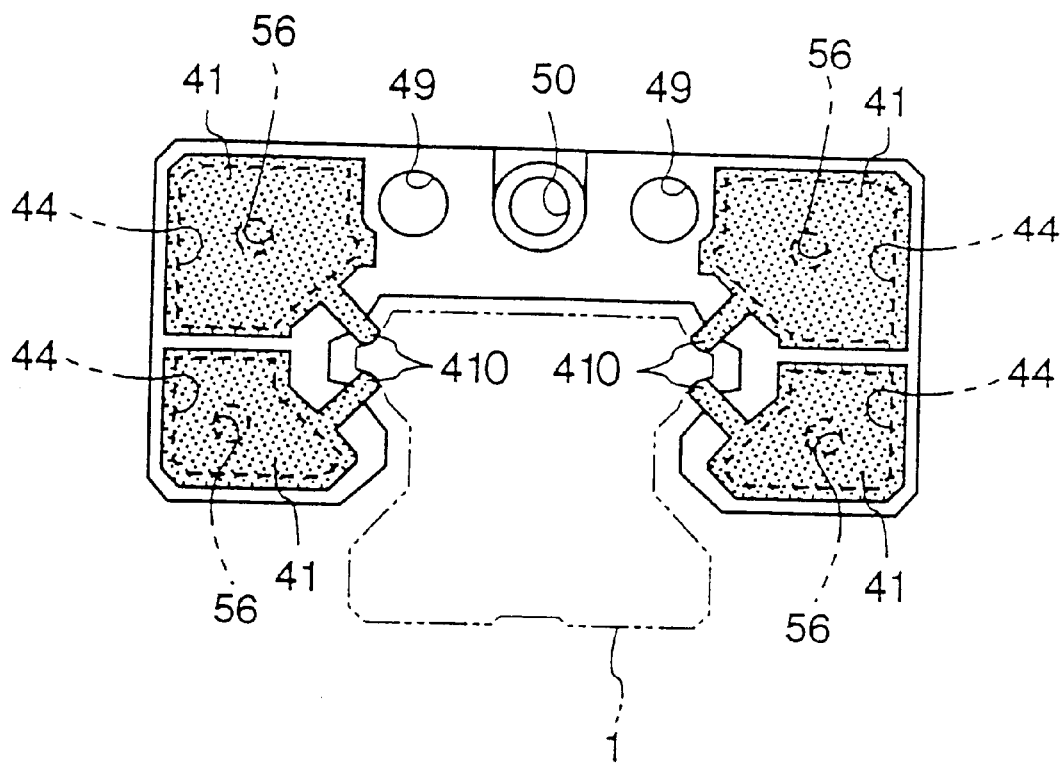
FIG. 11 is a sectional view showing other example of the lubricant supplying member of the present invention.

From this viewpoint, if the lubricant accommodating chamber 44 is formed for each coating piece 410 in contact with the ball rolling face 11 of the track rail 1 as shown in FIG. 11 and each lubricant accommodating chamber 44 contains the absorbing body 42 and application body 41, the amount of lubricant to be applied from each coating piece 410 to the track rail 1 can be further equalized.

On the other hand, if standing on a viewpoint of facilitating the procedure for attaching or detaching the lubricant supplying member 4 to/from the sliding base 2, it is preferable that the casing 40 of the lubricant supplying member 4 is constituted of a pair of casing half bodies 40a, 40a and the lubricant accommodating chamber 44 is disposed individually in each of the casing half bodies 40a, 40a.

The pair of the casing half bodies 40a, 40a for sandwiching the track rail 1 from the right and left sides are joined swingably by a joint portion 7 described later. A ring member 57 (see FIG. 6) having the through hole 50 for the supply nipple 27 is structured to be fit in between the casing half bodies 40a and 40a and above the joint portion 7. This ring member 57 also has a function for locking the mutual swinging of the casing half bodies 40a, 40a around the joint portion 7.

Figure 13:
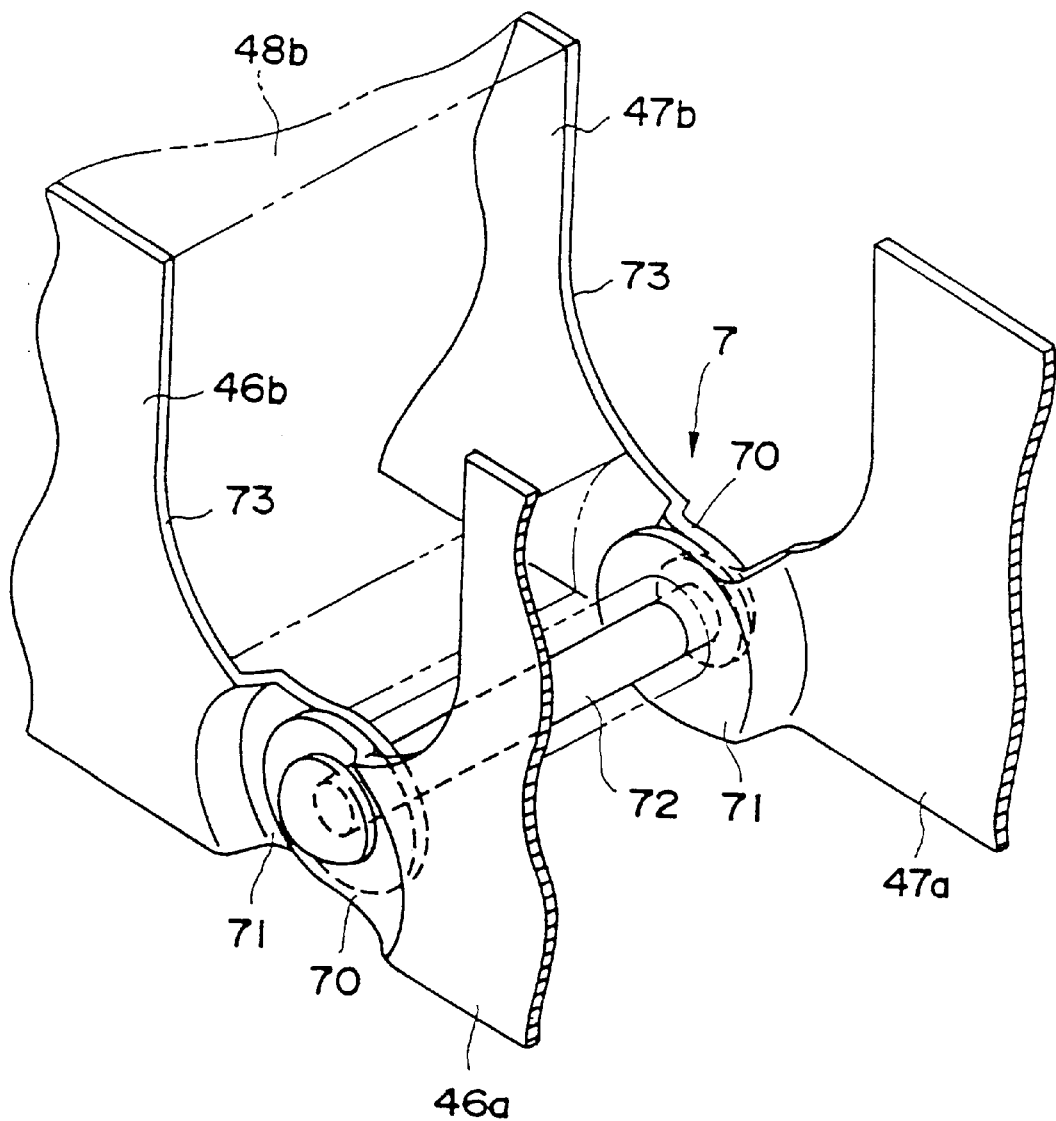
FIG. 13 is an enlarged perspective view showing a joint portion for joining a pair of the casing half bodies.

FIG. 13 shows the joint portion 7 for joining the pair of the casing half bodies 40a, 40a to each other. A semi-circular flange portion 70 is formed on the lid substrate 46a of the casing half body 40a such that it is protruded therefrom, while a semi-circular flange portion 71 overlapping the rear side of the aforementioned flange portion 70 is formed on the lid substrate 46b of the casing half bodies 40b such that it is protruded therefrom. In the same way, the flange portion 70 having the same shape as the lid substrate 46a is formed on the substrate 47b of the casing half body 40b such that it is protruded therefrom and, on the other hand, a flange portion 71 having the same shape as the aforementioned lid substrate 46b is formed on the lid substrate 47a of the casing half body 40a such that it is protruded therefrom. A pin 72 passes through the two pairs of the overlapping flange portions 70, 71 so that the joint portion 7 is constructed and the pair of the casing half bodies 40a, 40b are joined together swingably relative to each other. A portion above the flange portions 70, 71 serves for a engagement portion 73 for the ring member 57. In a condition in which the ring member 57 is mounted in this engagement portion 73, the swing motion of the casing half bodies 40a, 40b is blocked by the ring member 57.

Figure 12:
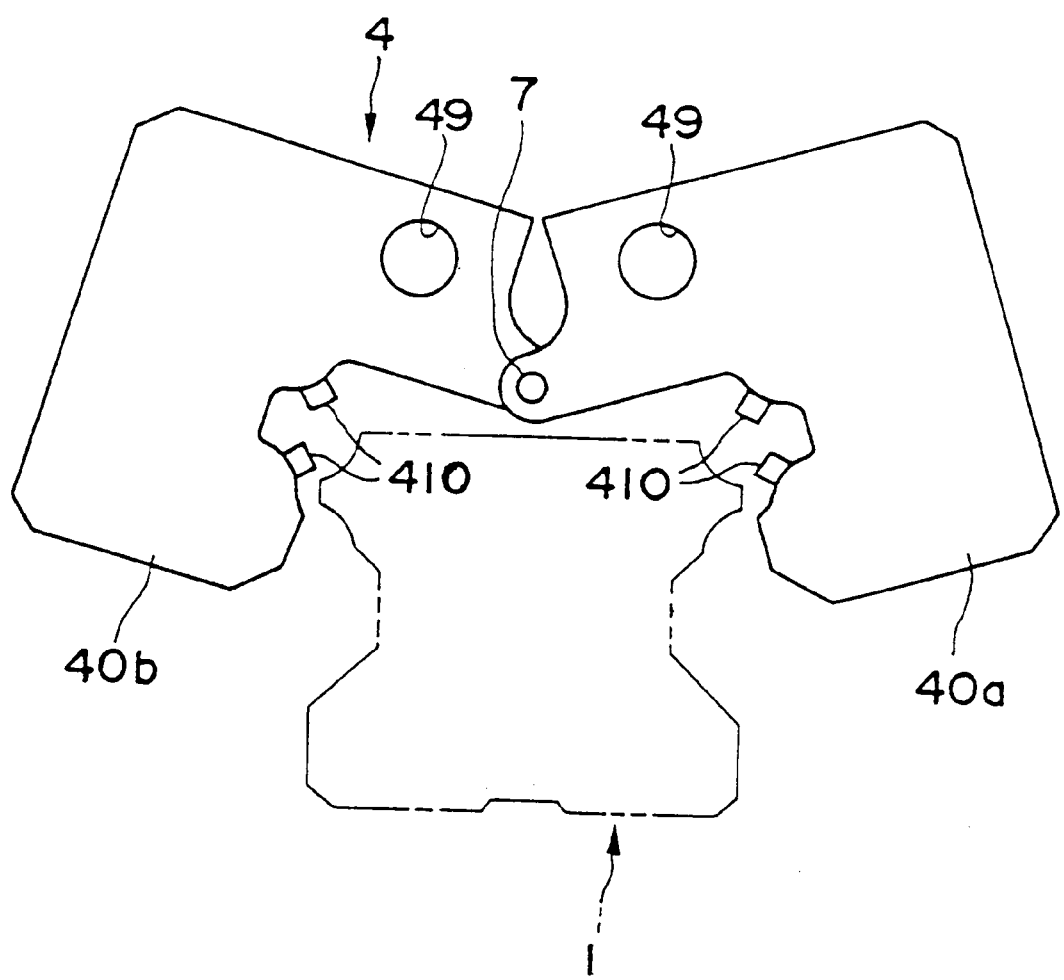
FIG. 12 is a schematic view showing an example in which a casing for the lubricant supplying member is constituted of a pair of casing half bodies.

Therefore, as shown in FIG. 12, with the fixing bolts 28 removed from the through hole 49 of each of the casing half bodies 40a, 40a and additionally the ring member 57 removed, it is possible to open the lubricant supplying member 4 by swinging the respective casing half bodies 40a, 40a so as to detach the coating pieces 410 from the ball rolling face 11 of the track rail 1. Namely, it is possible to release the condition in which the track rail 1 is sandwiched by the casing half bodies 40a, 40a, so as to remove the lubricant supplying member 4 from the sliding base 2. Further, the mounting of the lubricant supplying member 4 onto the sliding base 2 can be carried out in an inverse procedure. The opened lubricant supplying member 4 is closed so that the track rail is sandwiched by the casing half bodies and the ring member 57 is mounted in the engagement portion 73 to lock the swing motions of the casing half bodies 40a, 40a. Then by inserting the fixing bolts 28 into the through holes 49 in the casing half bodies 40a, 40b, the lubricant supplying member 4 can be mounted.

That is, this lubricant supplying member 4 can be mounted on the sliding base 2 from a direction perpendicular to the axial direction of the track rail 1, and can be attached and detached to/from the sliding base 2 not through an end portion of the track rail 1 unlike the conventional lubricant supplying member not provided with the joint portion 7, so that the replacement procedure can be carried out very easily.

Although the joint portion 7 shown in FIG. 13 is so constructed that both ends of the pin 72 going through the flange portion 71 are caulked to inhibit removal of the pin 72 from the flange portion 71, it is permissible to so construct that the pin 72 can be attached or detached to/from the flange portion 71 so as to make it possible to handle each casing half body 40a independently at the time of maintenance of the lubricant supplying member 4.

Further, although in the above described embodiment, the joint portion 7 is so constructed that the pair of the casing half bodies 40a, 40b are joined together swingably and even after the lubricant supplying member 4 is removed from the track rail 1 the pair of the casing half bodies 40a, 40b are still joined to each other, it is permissible to so construct that joint a portion that the casing half bodies 40a, 40b are jointed to each other from both sides of the track rail 1 with, for example, a screw and with the lubricant supplying member 4 completely removed from the track rail 1, the casing half bodies 40a, 40b are separated completely from each other.

Further, according to this embodiment, only the casing 40 of the lubricant supplying member 4 is constituted of the pair of the casing half bodies 40a, 40b so that they can be opened thereby facilitating the attaching and detaching thereof to/from the track rail 1, however, the end seal 5 and reinforcement plate 61 of the protective scraper 6 may be constituted of a pair of their half bodies so as to intensify ease of the attaching and detaching thereof relative to the track rail 1. Meanwhile, the elastic member 60 of the protective scraper 6 is easy to mount on the track rail because of its material, and therefore this does not have to be constituted of a pair of the half bodies.

Figure 14:
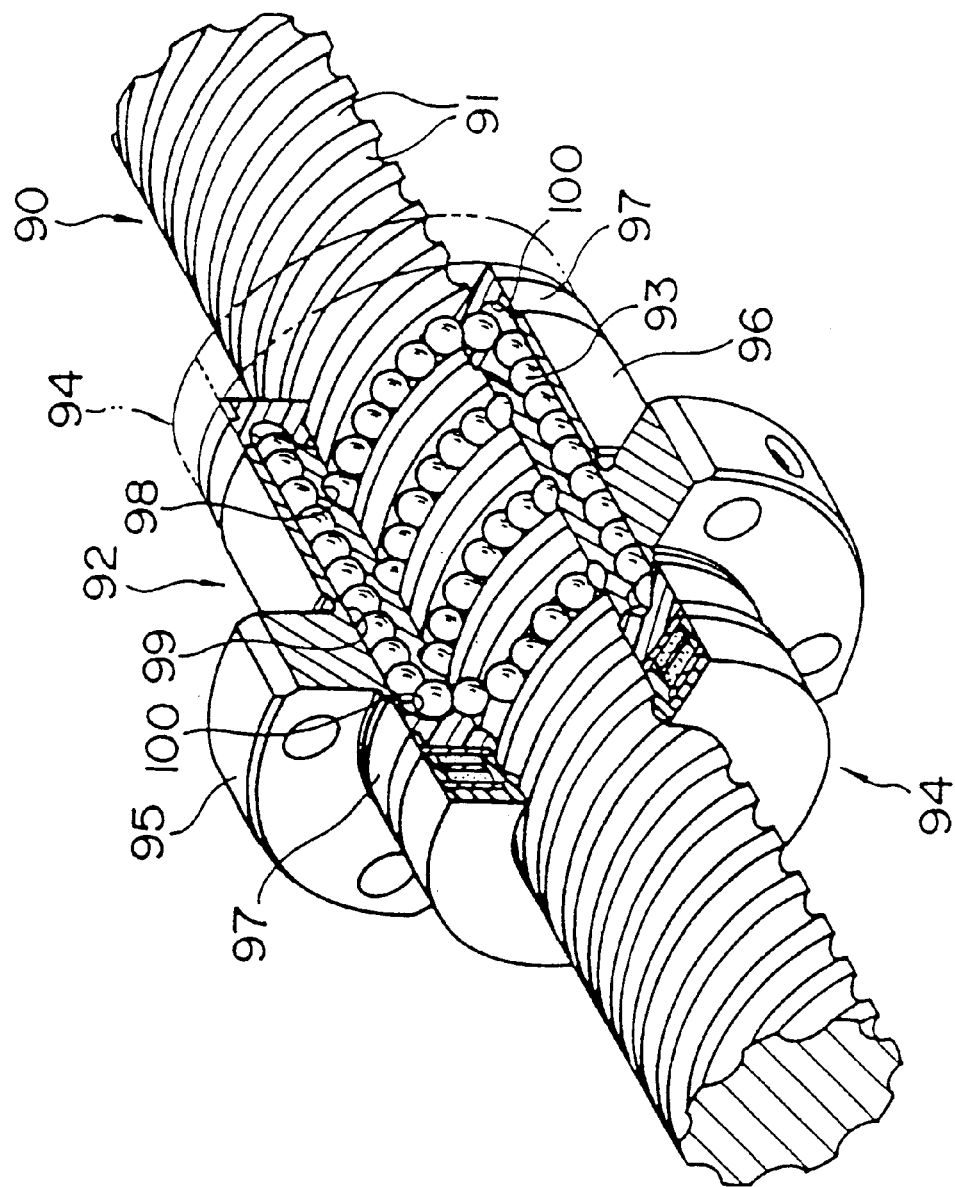
FIG. 14 is a partially cutaway perspective showing an embodiment in which the present invention is applied to a ball screw unit.
Figure 15:
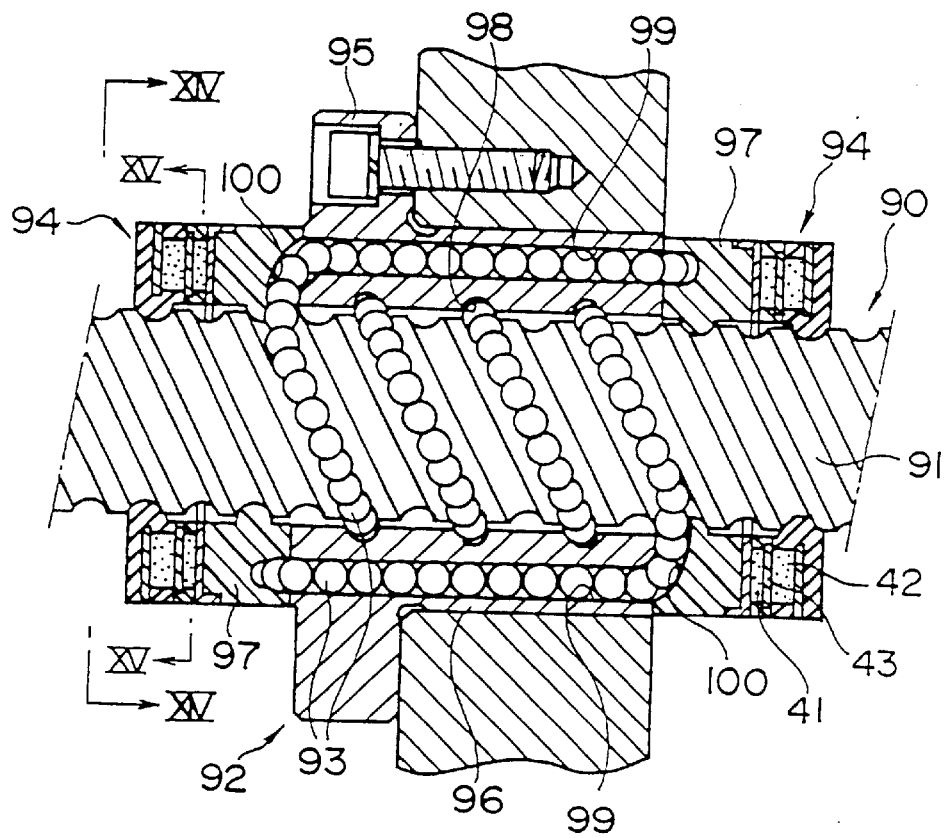
FIG. 15 is a sectional view showing a use state of the ball screw unit shown in FIG. 14.
Figure 16:
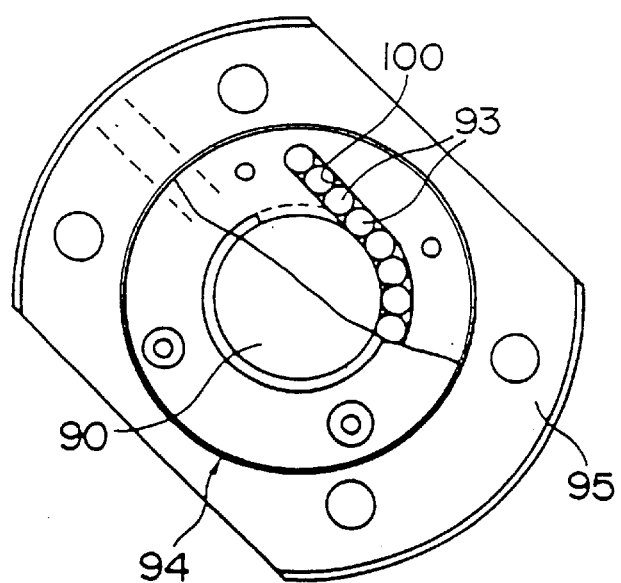
FIG. 16 is a view taken along the line XIV—XIV of FIG. 15.

FIGS. 14–16 show an embodiment in which the lubricant supplying member of the present invention is mounted on a ball screw unit which is an example of the linear motion apparatus.

Referring to the same Figure, reference numeral 90 denotes a screw shaft (track shaft) in which a spiral ball rolling groove 91 is formed at a predetermined lead, reference numeral 92 denotes a nut member (slide member) which has an infinite track in which the balls 93 circulate and engages the aforementioned screw shaft 90 through the balls 93 and reference numeral 94 denotes a lubricant supplying member which is mounted on both the front and read end faces of the nut member 92.

Here, the nut member 92 comprises a steel made nut main body 96 in which a flange portion 95 for fixing the same nut member 92 and a pair of lid bodies 97, 97 made of synthetic resin which are to be fixed to both the front and rear end faces of the nut main body 96.

The nut main body 96 contains a spiral load rolling groove 98 opposing the ball rolling groove 91 of the screw shaft 90, which is formed on an internal periphery thereof and a ball return hole 99 parallel to the screw shaft 90 which is made therein. In the lid body 97, a direction changing path 100 for leading the balls 93 which have finished rolling in the load rolling groove 98 to an end of the ball return hole 99 and introduces the balls 93 from the other end of the ball return hole 99 to the load rolling groove 98 is formed, and by fixing the lid body 97 to the nut main body 96, the infinite track for the balls 93 is completed. According to the ball screw unit of this embodiment, two ball rolling grooves 91, 91 are formed on the screw shaft 90 such that their phase is displaced by 180° and therefore, two infinite tracks are formed in the nut main body 96.

Figure 17:
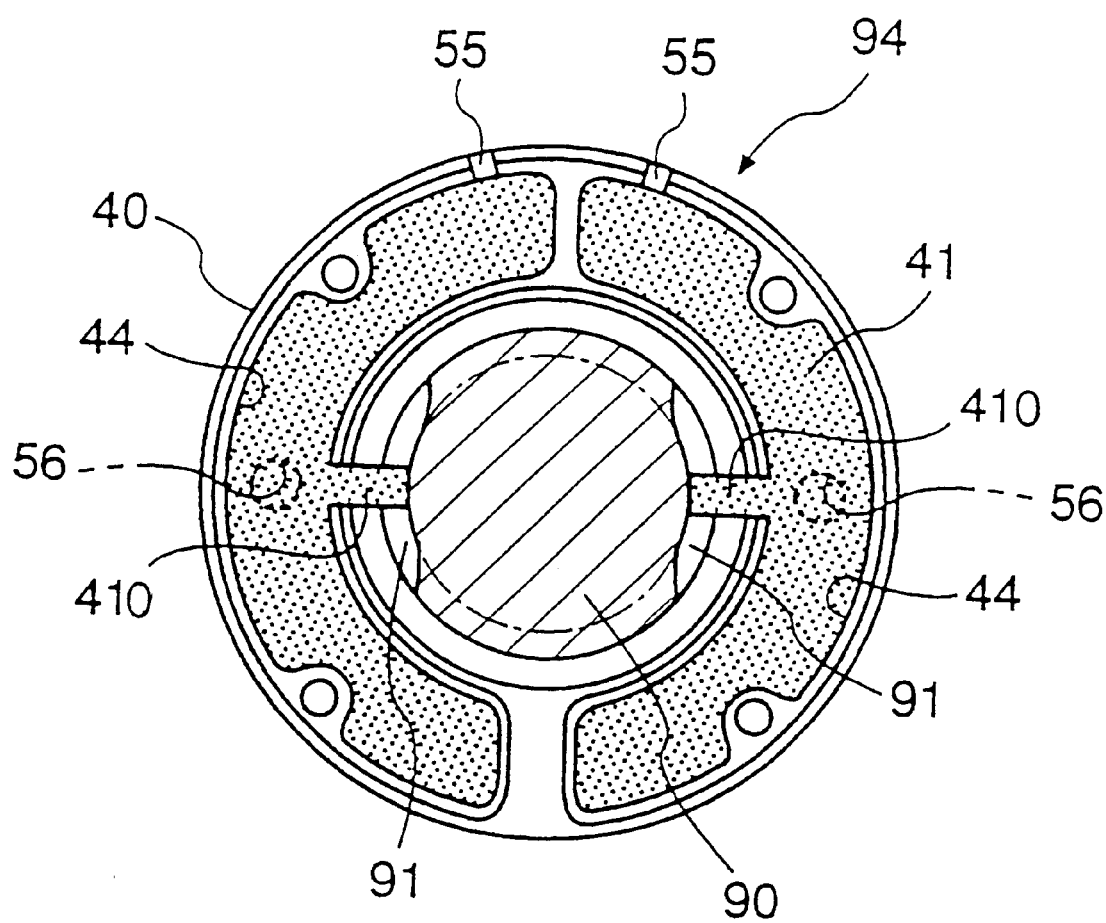
FIG. 17 is a sectional view taken along the line XV—XV of FIG. 15.

As shown in FIG. 17, the lubricant supplying member 94 is formed in a ring shape coinciding with the shape of the nut member 92, however, the application body 41, oil amount adjusting plate 43 and absorbing body 42 are incorporated within the lubricant accommodating chamber 44 like the above mentioned lubricant supplying member 4 mounted on the linear guide unit. Because according to this embodiment, two ball rolling grooves 91 are formed on the screw shaft 90, as previously mentioned, the coating pieces 410, 410 are protruded from two positions opposing each other on an internal peripheral face of the casing 40 so that each ball rolling groove 91 of the screw shaft 90 is coated with lubricant with these coating pieces 410, 410. That is, lubricant stored by the absorbing body 42 in each lubricant accommodating chamber 44 is supplied through the supply hole 56 made in the oil amount adjusting plate 43 and moved in the application body 41 to the coating piece 410 by capillary phenomenon. After that, lubricant is applied from the coating piece 410 to the ball rolling groove 91 of the screw shaft 90.

Further, according to this embodiment, the lubricant accommodating chamber 44 is divided to two sections along the circumferential direction of the casing 40, so that the divided individual lubricant accommodating chambers 44, 44 correspond to each coating piece 410. Therefore, only a divided lubricant accommodating chamber 44 corresponds to a single coating piece 410 and this is the same as the lubricant supplying member 4 shown in FIG. 11. To carry out smoothly application of lubricant through the coating piece 410, each lubricant accommodating chamber 44 is provided with an air hole 55.

In the ball screw unit of this embodiment having such a structure, if the screw shaft 90 and nut member 92 rotate relatively, the balls 93 run in the load rolling groove 98 of the nut member 92 and ball rolling groove 91 of the screw shaft 90 and then, the nut member 92 moves in the axial direction of the screw shaft 90 while rotating on the periphery of the screw shaft 90. At this time, lubricant is applied to the ball rolling groove 91 of the screw shaft 90 from the lubricant supplying member 94 with a progress of the nut member 92 so that the ball rolling groove 91 and balls 93 which run therein are lubricated like the previously described embodiment.

Because in the ball screw unit of this embodiment, the lubricant accommodating chamber 44 is divided for each coating piece 410 for applying lubricant to each of two ball rolling grooves 91 of the screw shaft 90, there is not so prominent difference in position energy possessed by lubricant contained in the lubricant accommodating chamber 44 with respect to each coating piece 410 like the embodiment of the linear guide system described above, so that the phenomenon that lubricant is moved within the application body 41 to the coating piece 410 largely depends on the capillary phenomenon. As a result, in case where the nut member 92 is used in a certain fixed state or in a rotating condition, the amount of lubricant to be applied to the screw shaft 90 from each coating piece 410 can be equalized.

Figure 18:
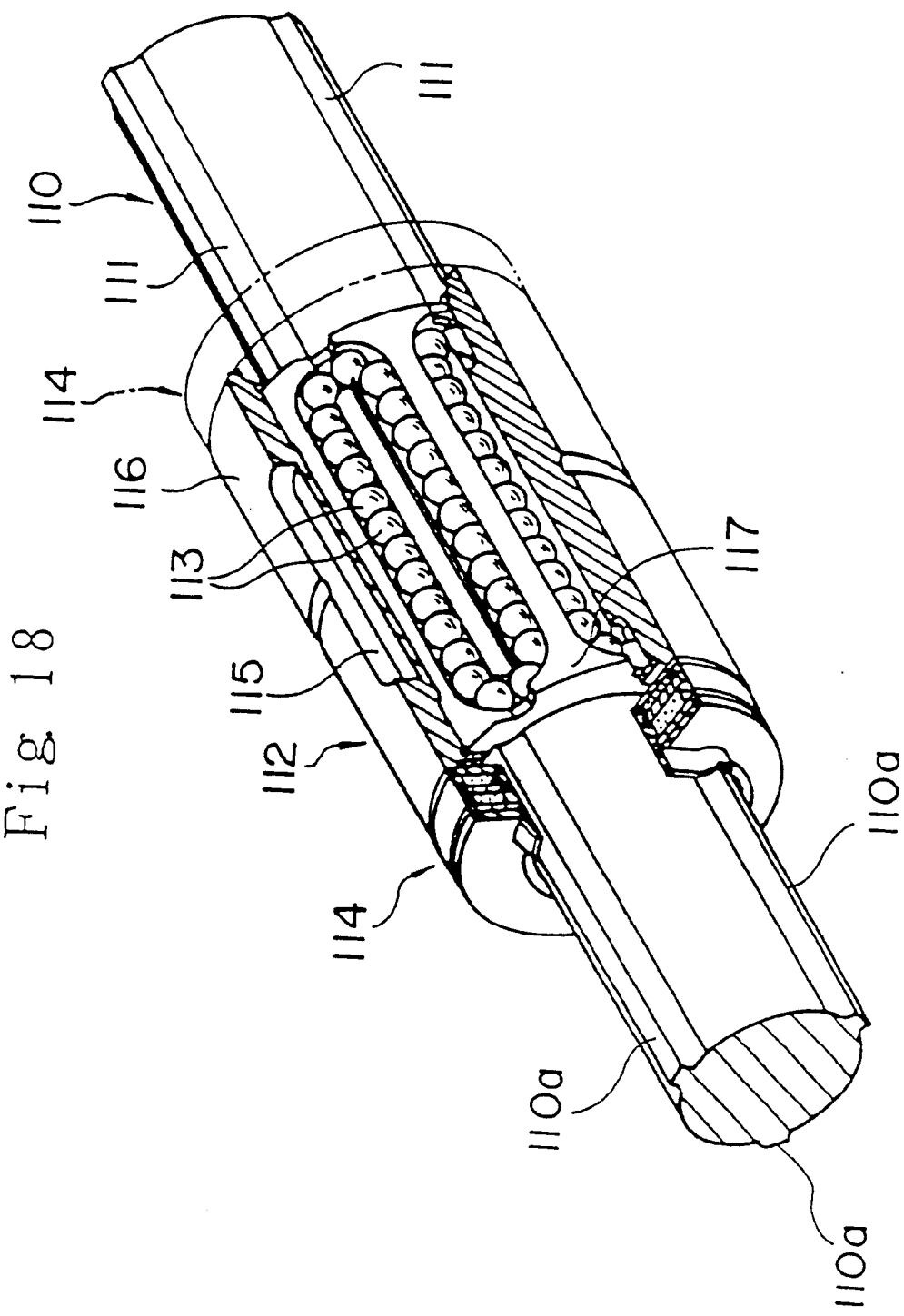
FIG. 18 is a partially cutaway perspective view showing an embodiment in which the present invention is applied to a ball spline unit.
Figure 19:
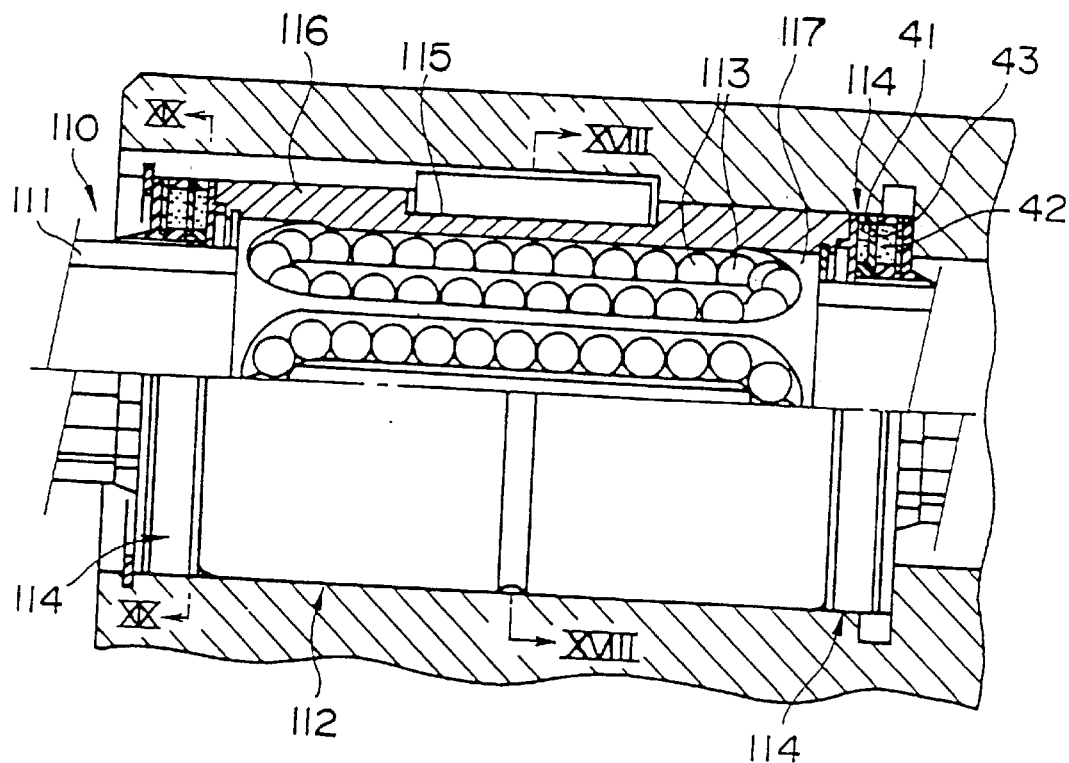
FIG. 19 is a sectional view showing a use condition of the ball spline shown in FIG. 18.
Figure 20:
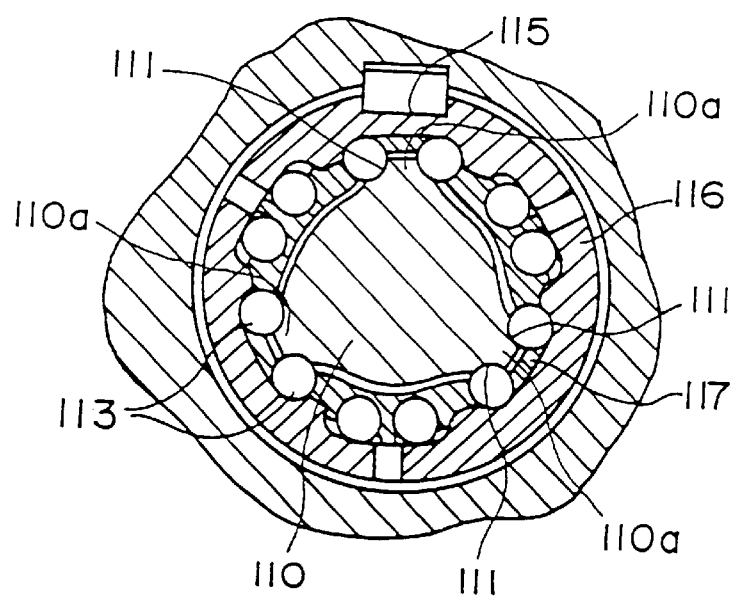
FIG. 20 is a sectional view taken along the line XVIII—XVIII of FIG. 19.

FIGS. 18–20 show an embodiment in which the lubricant supplying member of the present invention is applied to a ball spline unit which is an example of the linear motion apparatus.

Referring to the same Figures, reference numeral 110 denotes a spline shaft (track shaft) in which a ball rolling groove 111 is formed along the axis thereof, reference numeral 112 denotes a nut member (slide member) which has an infinite track in which balls 113 circulate and engages the spline shaft 110 through the balls 113 and reference numeral 114 denotes a lubricant supplying member which are mounted on both the front and rear end faces of the nut member 112.

Here, the nut member 112 comprises a nut main body 116 made of steel in which a key groove 115 for fixing the same nut member 112 is formed on an external peripheral face thereof and a ball holding device 117 made of synthetic resin which engages an internal periphery of the nut main body 116 for forming an infinite circulation path for the balls 113. On the other hand, the aforementioned spline shaft 110 has corner portions 110a which are disposed at each position dividing the circumference thereof to three equally and have a substantially triangular cross section each, and two ball rolling grooves 111 are formed on both sides of each corner portion 110a, thereby totally six ball rolling grooves being formed on the circumference.

Figure 21:
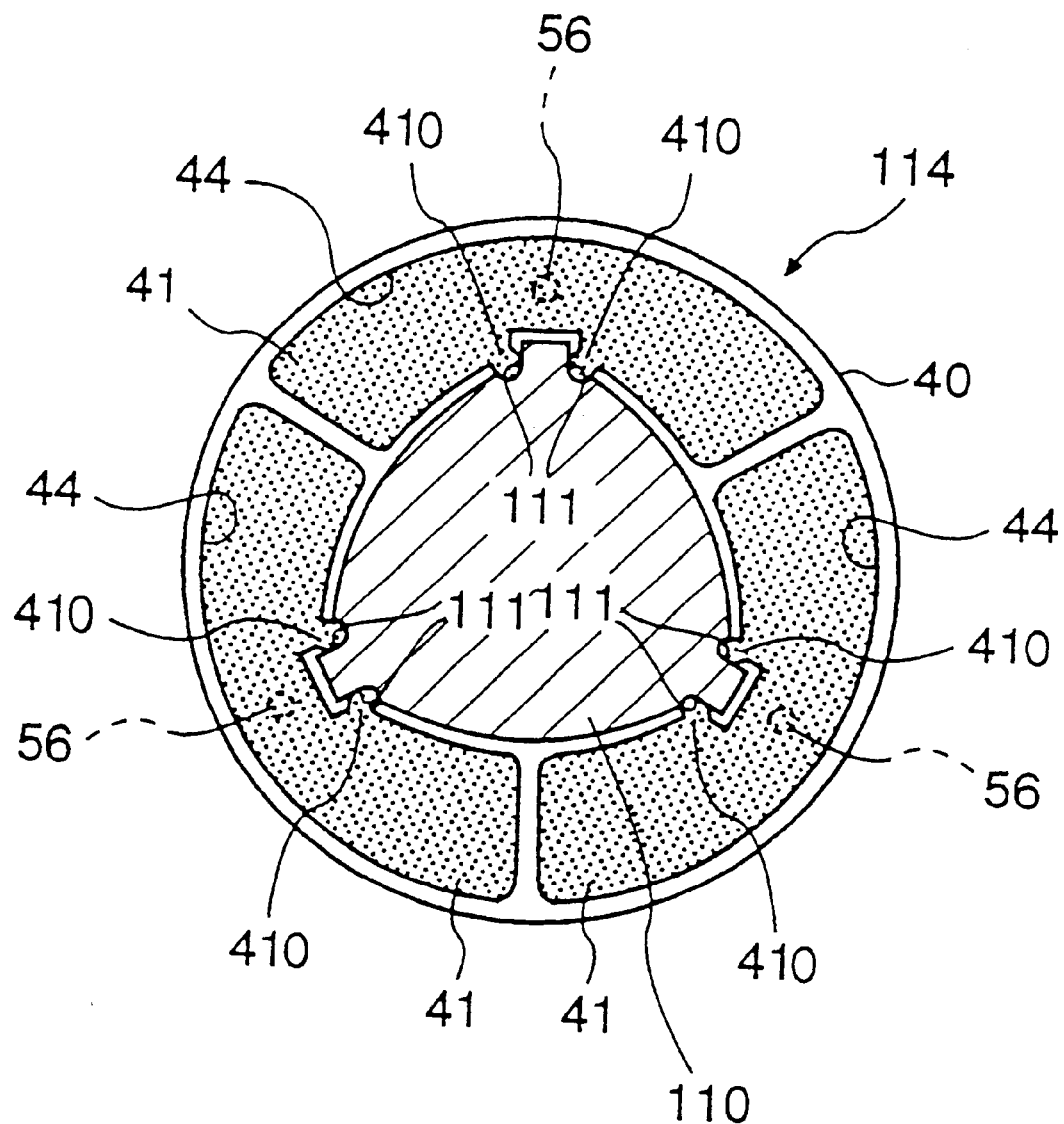
FIG. 21 is a sectional view taken along the XIX—XIX of FIG. 19.
Figure 22A:
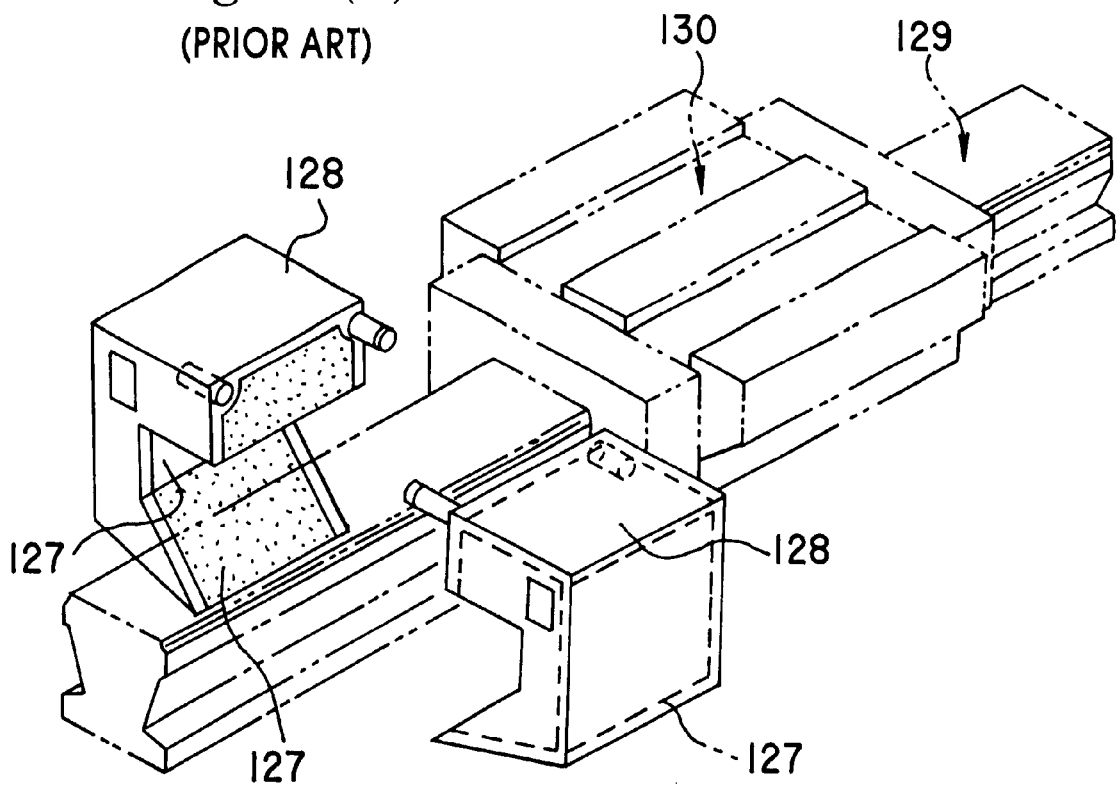
FIG. 22 is partial sectional view showing an example of a conventional linear motion apparatus.
Figure 22B:
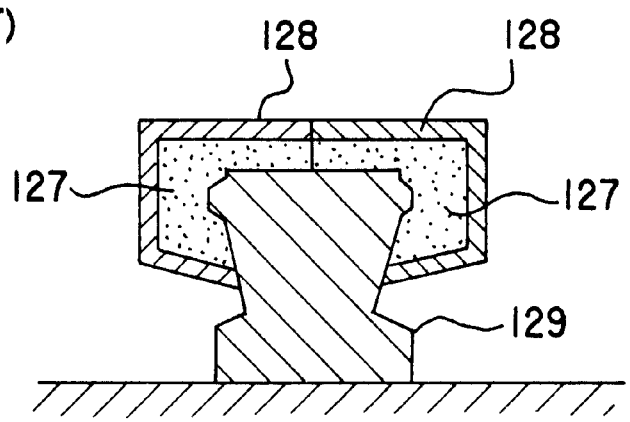
Figure 23:
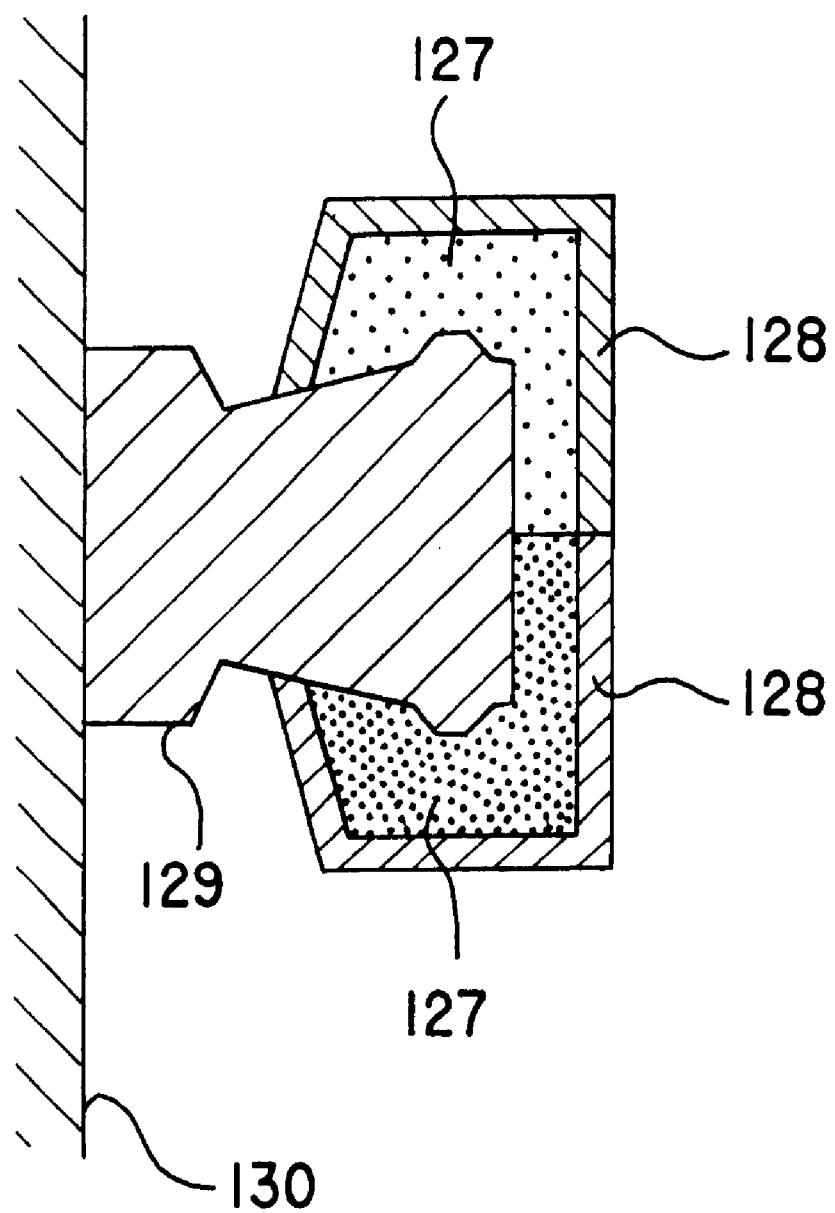
FIG. 23 is a sectional view showing a state in which the conventional linear motion apparatus shown in FIG. 22 is mounted on a vertical fixing unit.

Although the lubricant supplying member 114 shown in FIG. 21 is formed in a ring shape coinciding with the shape of the nut member 112, the application body 41, oil amount adjusting plate 43 and absorbing body 42 are incorporated in the lubricant accommodating chamber 44 of the casing 40 like the lubricant supplying members 4, 6 mounted on the linear motion apparatus described above. Because in this embodiment, as described above, six ball rolling grooves 111 are formed on the spline shaft 110, the coating pieces 410 are protruded from an internal peripheral face of the casing 40 at six positions each opposing the ball rolling grooves 111. The ball rolling grooves 111 on the spline shaft 110 are coated with lubricant by these coating pieces 410. That is, lubricant stored by the absorbing body 42 in each lubricant accommodating chamber 44 is supplied to the application body 41 through a supply hole 56 made in the oil amount adjusting plate 43 and then moved within the application body 41 to the coating piece 410 by capillary phenomenon. After that, lubricant is applied to the ball rolling groove 111 of the spline shaft 110 by the coating piece 410.

Further, because in the ball spline unit of this embodiment, the ball rolling grooves 111 are formed on both side faces of each corner portion 110a of the spline shaft 110, it can be understood that totally six ball rolling grooves 111 are formed as a group of two grooves for each corner portion 110a. Therefore, in this embodiment, the lubricant accommodating chamber 44 is divided to three sections along the circumference of the casing 40, the divided respective lubricant accommodating chambers 44, 44, 44 correspond to each corner portion 110a of the spline shaft 110. Thus, it comes that two ball rolling grooves 111, 111 formed on each corner portion 110a are coated with lubricant from two coating pieces 410, 410 belonging to a divided lubricant accommodating chamber 44. To apply lubricant smoothly from these coating pieces 410, an air hole (not shown) is provided on each lubricant accommodating chamber 44.

Then, according to the ball spline unit of this embodiment having such a structure, if the nut member 112 is moved along the spline shaft 110, lubricant is applied to the ball rolling groove 111 of the spline shaft 110 from the lubricant supplying member 114 mounted on the nut member 112, so that the ball rolling groove 111 and the balls 113 running therein are lubricated like the previously described embodiments.

Because in the ball spline unit of this embodiment, the two ball rolling grooves 111, 111 formed on each corner portion 110a of the spline shaft 110 serves as a group and the lubricant accommodating chamber 44 is divided for every two corner portions 110a which come into contact with this pair of the ball rolling grooves 111, 111, there is not so prominent difference in height between each corner portion 110a of the spline shaft 1 and corresponding lubricant accommodating chamber 44, so that the motion of lubricant within the application body 41 to the coating piece 410 largely depends on capillary phenomenon. As a result, in case where the nut member 112 is used in a constant fixed state or in a rotating condition, the amount of lubricant to be applied from each coating piece 410 to the spline shaft 110 can be equalized.

What is claimed is:

1. A lubricant supplying system mounted on a slide member engaging a track shaft through rolling bodies for applying lubricant to said track shaft with a relative motion between the slide member and track shaft, said lubricant supplying system comprising:
    a casing fixed to said slide member;
    a plurality of coating pieces which are protruded from plural positions of the casing so that said plurality of coating pieces are in contact with said track shaft for coating said track shaft with lubricant;
    plural lubricant accommodating chambers provided in said casing for supplying lubricant to said plurality of coating pieces;
    an absorbing body for absorbing and storing lubricant; and
    an oil amount control means for controlling an amount of lubricant to be supplied from said absorbing body to at least one of the plurality of the coating pieces,
    wherein at least one of the plurality of the coating pieces and the absorbing body are formed on opposite sides of the oil amount control means,
    wherein the plurality of said coating pieces are divided into groups, each group comprising at least one coating piece and separate said lubricant accommodating chambers are formed for each of the groups, and wherein each said lubricant accommodating chamber contains said separate absorbing body.

2. The lubricant supplying apparatus as claimed in claim 1, wherein said casing is constituted of a pair of casing half bodies, each containing at least one lubricant accommodating chamber therein, and the casing half bodies are joined together by a joint portion so as to be capable of being attached or detached to/from a track shaft by opening the casing half bodies.

3. A lubricant supplying apparatus as claimed in claim 2, wherein said joint portion comprises a flange portion formed on each of the casing half bodies so as to protrude therefrom and a pin passing through the flanges, said joint portion swingably joining the pair of the casing half bodies together.

* * * * *